S. A. BEMIS, DEC'D.
E. M. BEMIS, EXECUTRIX.
ICE SCRAPING ATTACHMENT FOR TROLLEYS.
APPLICATION FILED OCT. 12, 1910.
1,046,409.
Patented Dec. 3, 1912.
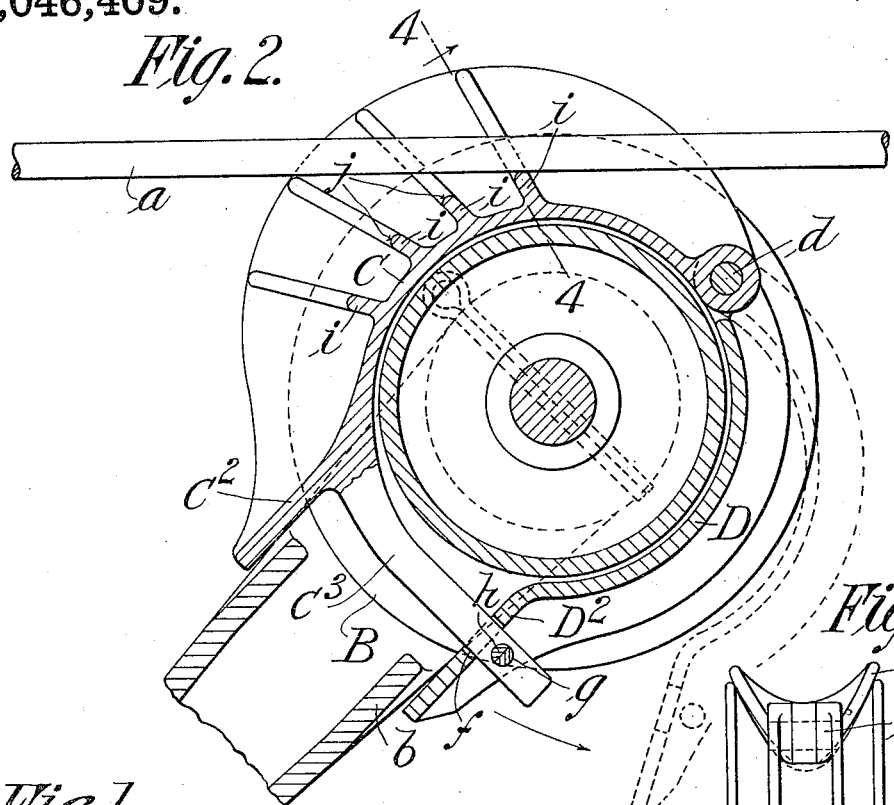
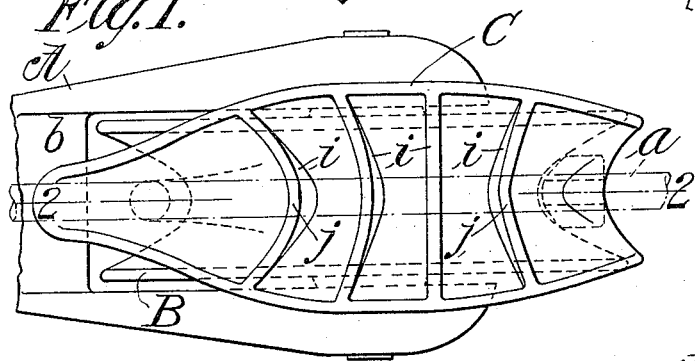
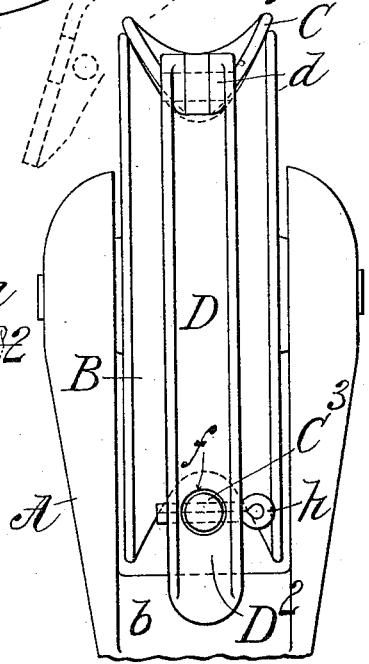
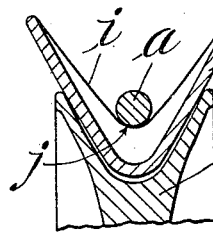
WITNESSES:
H. L. Sprague
R. M. Mowry
Ella M. Bemis
Executrix of last will of
Sumner A. Bemis, deceased
INVENTOR
by Wm. S. Bellows
ATTORNEY.

UNITED STATES PATENT OFFICE.

SUMNER A. BEMIS, DECEASED, LATE OF SPRINGFIELD, MASSACHUSETTS, BY ELLA M. BEMIS, EXECUTRIX, OF SPRINGFIELD, MASSACHUSETTS.

ICE-SCRAPING ATTACHMENT FOR TROLLEYS.

1,046,409.

Specification of Letters Patent. Patented Dec. 3, 1912.

Application filed October 12, 1910. Serial No. 586,787.

*To all whom it may concern:*

Be it known that SUMNER A. BEMIS, deceased, late a citizen of the United States of America, and resident of Springfield, in the county of Hampden and State of Massachusetts, did invent certain new and useful Improvements in Ice-Scraping Attachments for Trolleys, of which the following is a full, clear, and exact description.

The object of this invention is to provide an attachment to be employed in a confined embracing relation about a trolley wheel which is mounted in the usual manner in a yoke shaped head or "harp" which will have the capability of scraping ice from a trolley wire as the car,—on which the trolley wheel and its attachment are carried,—has its travel, and to insure an effectual scraping of the ice from the wire irrespective of the angle at which the trolley carried pole may have.

A further object of the invention is to so construct the scraping attachment that it will be prevented from having any turning or rotative movement relatively to the trolley wheel and head in which the wheel is carried, but will always be held in an appropriate working position. And a further object is to produce a scraping attachment most cheaply and of an extremely simple form.

The invention is described, hereinbelow, in conjunction with the accompanying drawings and is defined in the claim.

In the drawings:—Figure 1 is a plan view of a portion of a trolley head or harp having a trolley wheel mounted therein and showing the ice scraping attachment in relation to said parts. Fig. 2 is a sectional elevation centrally taken on the plane indicated, line 2—2, Fig. 1. Fig. 3 is a front elevation, and Fig. 4 is a partial transverse section as taken on line 4—4, Fig. 2.

Similar characters of reference indicate corresponding parts in all of the views.

In the drawings, A represents a yoke shaped trolley head or harp having rotatably mounted therein a trolley wheel B which is of the usual grooved form.

The scraping attachment for removing ice from the trolley wire (which latter is represented at $a$) consists of a frame including two partially circular members C and D, which are connected the one to the other by the hinge joint represented at $d$. These partially circular members have shank portions $C^2$ and $D^2$ which are downwardly extended in separated relations so as to embrace and engage at the rear and front sides the base or shank portion $b$ of the trolley head. The shank portion $D^2$ has an aperture $f$ transversely therethrough, and the shank portion of the other frame member C has an angularly projecting bar-like extension $C^3$ for engagement through said aperture and is provided at its extremity with a transverse hole $g$ for receiving a cotter pin $h$ or other locking pin therethrough, the latter having its engagement also through the opposite side walls of the shank portion $D^2$ of the frame member D which, as a matter of design is made cross sectionally of U-shape. The engagement of the shank members $C^2$ and $D^2$ with the base or shank of the trolley head at the rear and front sides thereof prevents the attachment from having any turning movement relatively to the trolley wheel and its carrying head. One of the said partially circular frame members C is of a trough shape and has a plurality of scraping ribs $i$ $i$ arranged one in advance of another,—these ribs extending transversely relatively to the curve length of the member C and their upper edges are downwardly convergent and have an arc shaped formation at their lower adjoined portions $j$ as is especially represented in Fig. 4 for presenting an appropriate form of scraping edge against and more or less around the underside of the wire. By providing several of the scraping ribs and positioning the same one in advance of the other, if the trolley pole is carried at a comparatively steep inclination, the edge of the forward rib will be in its scraping presentation, while if the inclination of the trolley pole becomes lessened one of the rearward ribs will perform the scraping action for the removal of the ice from the wire.

What is claimed is:—

The combination with a trolley head or yoke and a trolley wheel mounted therein, of a frame consisting of two partially circular members hinge connected one to the other, having shank portions extending downwardly in separated relations for embracing and engaging the base portion of the trolley head, at the front and rear sides thereof, one of said members having in the shank portion thereof an aperture above the base portion of the head, and the other shank member having an integrally formed, rigid, and angularly extended, bar-like member adapted for engagement through said aperture, and having a perforation therethrough at its end portion, a locking pin detachably engaged through the perforation in said bar like member outside of the apertured shank, and one of said partially circular frame members being of trough shape and having a plurality of transverse scraping ribs therein, one in advance of another,— the upper edges of said ribs being oppositely downwardly convergent and having an arc shaped formation at their lower adjoining portions.

Signed at Springfield, Mass., in presence of two subscribing witnesses.

ELLA M. BEMIS,
*Executrix of the last will and testament of Sumner A. Bemis, deceased.*

Witnesses:
WM. S. BELLOWS,
G. R. DRISCOLL.

Copies of this patent may be obtained for five cents each, by addressing the "Commissioner of Patents, Washington, D. C."